United States Patent Office 3,078,254
Patented Feb. 19, 1963

3,078,254
HIGH MOLECULAR POLYMERS AND METHOD FOR THEIR PREPARATION
Robert P. Zelinski and Henry L. Hsieh, Bartlesville, Okla., assignors to Phillips Petroleum Company, a corporation of Delaware
No Drawing. Filed July 20, 1959, Ser. No. 828,058
20 Claims. (Cl. 260—45.5)

This invention relates to polymers of increased molecular weight prepared by reacting terminally reactive polymers with compounds containing active halogens. In one aspect the invention relates to solid polymers prepared by heat curing polymers obtained by reacting polymers containing terminal alkali metal atoms with compounds containing active halogens. In still another aspect of the invention curing is carried out in the presence of a conventional curing system.

As used herein, the term "terminally reactive polymer" designates polymer which contains a reactive group at one or both ends of the polymer chain.

It is an object of this invention to provide new and useful polymeric materials of increased molecular weight, and process for their preparation.

Another object of this invention is to provide self-curing polymers from polymers containing terminal alkali metal atoms, and process for their preparation.

Still another object of this invention is to provide cured polymers from polymers obtained by reacting polymers containing terminal alkali metal atoms with compounds containing two or more active halogens.

These and other objects of the invention will become more readily apparent from the following detailed description and discussion.

The foregoing objects are realized broadly by reacting a polymer containing terminal alkali metal atoms with an organic compound containing at least two active halogens to obtain a polymer of increased molecular weight.

In one aspect of the invention the polymer product is subjected to heat whereby molecules of said polymer react with each other to form a cured polymer.

In another aspect of the invention curing of the polymer product is carried out in the presence of a conventional curing system.

The monomers which can be employed in the preparation of polymers containing terminal alkali metal atoms include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employed are aryl-substituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least 1 vinyl or alphamethyl-vinyl group, such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, etc.; similar mono- and di-substituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amount of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers of polymerizable vinylidene compounds and copolymers of conjugated dienes with vinylidene compounds also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing terminal reactive groups and their method of preparation is set forth in the copending application of R. P. Zelinski, Serial No. 796,277, filed March 2, 1959. This application describes a process for preparing block copolymers from monomers included in the following groups: (1) 1,3-butadiene, 2-methyl-1,3-butadiene, 1,3-pentadiene and vinyl-substituted aromatic hydrocarbons; (2) vinylpyridines; and (3) vinyl halides, vinylidine halides, acrylonitrile, esters of acrylic acid and esters of homologues of acrylic acid. The process comprises the steps of initially contacting a monomer selected from those included in groups (1) and (2) with an organo-lithium compound in the presence of a diluent selected from the group consisting of aromatic, paraffinic and cycloparaffinic hydrocarbons so as to form a polymer block; and, after polymerization of substantially all of the selected monomer, contacting the aforementioned catalyst in the presence of the polymer block initially formed and the hydrocarbon diluent with a monomer selected from those included in groups (1), (2) and (3) when the initial monomer is selected from group (1) and with a monomer selected from those included in group (3) when the initial monomer is selected from group (2), the monomer selected being different from the monomer employed in the initial contacting.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally on at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. The general reaction can be illustrated graphically as follows:

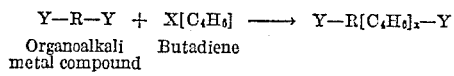

or

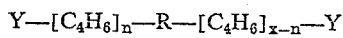

or combinations thereof.

A specific example is:

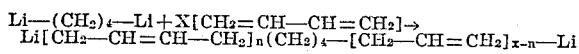

In the specific example 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course, include sodium, potassium, lithium, rubidium, and cesium. The organic radical of the organo alkali metal compound can be an aliphatic, cycloaliphatic or aromatic radical. For example, mono-, di- and polyalkali metal substituted hydrocarbons can be employed including methyllithium, n-butyllithium, n-decyllithium, phenyllithium, napthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,6-dilithiohexane, 1,10-dilithiodecane, 1,15-dipotassiopentadecane, 1,20-dilithiosicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1,1-diphenylethane, 1,2-disodio-1,2-triphenylpropane, 1,2-dilithio-1,2-diphenylethane, 1,2-dipotassiotriphenylethane, 1,2-dilithiotetraphenylethane, 1,2-dilithio-1-phenyl-1-naphthylethane, 1,2-dilithio-1,2-dinaphthylethane, 1,2-disodio-1,1-diphenyl-2-naphthylethane, 1,2-dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4-(2-lithiomethylphenyl)butane, 1,2-dipotassio-3-phenylpropane, 1,2-di(lithiobutyl)benzene, 1,3-dilithio-4-ethylbenzene, 1,4-dirubidiobutane, 1,8-dicesiooctane, 1,5,12-trilithiododecane, 1,4,7-trisodioheptane, 1,4-di(1,2-dilithio-2-phenylethyl)benzene, 1,2,7,8-tetrasodionaphthalene, 1,4,7,10-tetrapotassiodecane, 1,5-dilithio-3-pentyne, 1,8-disodio-5-octyne, 1,7-dipotassio-4-heptyne, 1,10-dicesio-4-decyne, 1,11-dirubido-5-hendecyne, 1,2-disodio-1,2-diphenylethane, dilithiophenanthrene, 1,2-dilithio-triphenylethane, 1,2-disodio-1,2-diphenylethane, dilithiomethane, 1,4-dilithio-1,1,4,4-tetraphenylbutane, 1,4-dilithio-1,4-diphenyl-1,4-dinaphthylbutane, and the like While the organo alkali metal initiators in general can be employed, certain specific initiators give better results than others and are preferred in carrying out the preparation of the terminally reactive polymers. For example, of the condensed ring aromatic compounds the lithium-anthracene adduct is preferred, but the adducts of lithium with naphthalene and biphenyl can be employed with good results. Of the compounds of alkali metals with polyaryl-substituted ethylenes, the preferred material is 1,2-dilithio-1,2-diphenylethane (lithium-stilbene adduct). Ordinarily the organo dialkali metal compounds are more effective than others in promoting the formation of the terminally reactive polymers. The organo dialkali metal compounds which have been set forth as being preferred, are those which when prepared contain a minimum of the monoalkali metal compound.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between −100 and +150° C., preferably between −75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is prefered that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers prepared as hereinbefore described contain an alkali metal atom on at least one end of the polymer chain and the organo radical of the initiator is present in the polymer chain. These compounds can be converted to polymers of higher molecular weight by reaction or coupling with organic compounds containing two or more active halogen atoms. The active halogen containing compounds are those in which each halogen is attached to a carbon atom which is alpha to an activating group which is inert with respect to the alkali metal atoms in the terminally reactive polymer, for example, groups such as an ether linkage, a carbonyl group, a double bond

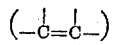

a carbon atom in the aromatic ring, and the like. The active halogen containing compounds can contain fluorine, chlorine, bromine or iodine, or mixtures of these materials; however, chlorine, bromine and iodine compounds are preferred, and more particularly compounds containing chlorine. Substituents which are inert with respect to the lithium atoms in the terminal reactive polymer can also be present in the active halogen containing compounds. Illustrative of these substituents are groups such as alkoxy, vinyloxy, tertiary amine and the like. In addition the active halogen containing compounds can contain various hydrocarbon groups, such as alkyl, cycloalkyl, aryl, aralykyl, and alkaryl, and can have a total of 20 carbon atoms.

The following reactions are illustrative of examples of the coupling reaction in which P represents the polymer chain.

(1)
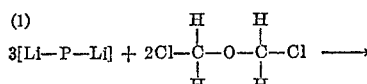
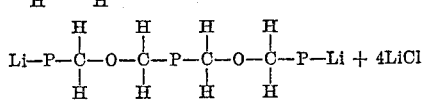

(2)
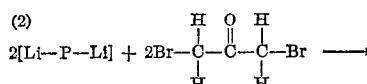
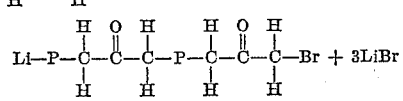

(3)
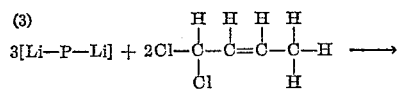
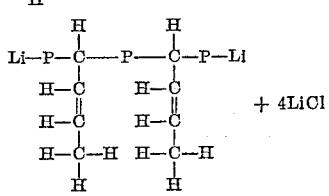

(4)
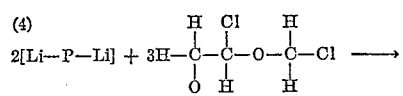

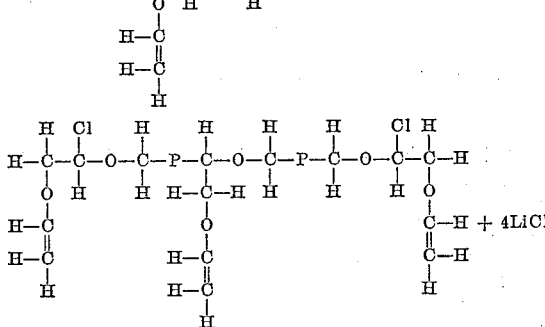

(5)
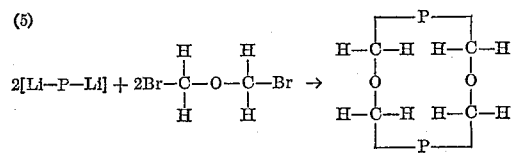

Specific active halogen containing compounds which can be employed in carrying out the invention include the following: bis(chloromethyl)ether, bis(1 - bromoethyl) ether, 1,3-dichloro-2-propanone, 1,5-dichloro-2,4-pentanedione, 1,4 - bis(chloromethyl)benzene, 1,4 - dichloro-2-butene, bis(bromomethyl) ether, methyl dichloromethyl ether, bis(1-fluoropropyl) ether, bis(iodomethyl) ether, chloromethyl 1-chloropropyl ether, bis(1-iodoamyl) ether, bis(1 - chlorodecyl) ether, hexyl 1,1-dichloroheptyl ether, 1-chloro-n-butyl 1,1-dichloro-n-butyl ether, bis(1,1-dibromodecyl) ether, 1,1-difluoroethyl 1-fluoroheptyl ether, bis[chloro(ethoxy)methyl] ether, bis[1-bromo(2-propyl)ethyl] ether, difluoromethyl 1-fluoro(3-ethoxy)propyl ether, bis[chloro(vinyloxy)methyl] ether, bis[1-iodo-(4-vinyloxy)n-butyl] ether, 1-bromo(2-vinyloxy)ethyl 1,1-dibromopropyl ether, bis[1 - chloro(5-vinyloxy)octyl] ether, bis[chloro(N,N-dimethylamino)methyl] ether, dibromomethyl 1 - bromo-4-(N,N-dimethylamino)n-butyl ether, bis[1-iodo-6-(N,N-diethylamino)hexyl] ether, 2,2-dibromo-3-decanone, 3,5,5-trichloro-4-octanone, 2,4-dibromo-3-pentanone, 1 - chloromethyl-4-(1-chloro-n-propyl)benzene, 1,3,5-tri(bromomethyl)benzene, 1,4-di-chloro-2-hexane, 4,4-di-chloro-2-heptene, 1,1-dibromo-4-chloro-2-pentene and 2,5,6,9-tetrachloro-3,7-decadiene.

In carrying out the invention the active halogen containing compound is added either per se or as a solution to the unquenched polymer solution. By "unquenched polymer" is meant polymer which has not been treated with any type of reagent to inactivate the catalyst. Suitable solvents for the active halogen containing compound include materials which are employed as diluents in the preparation of the polymers containing terminal alkali metal atoms. Reaction of the active halogen containing compound with the terminally reactive polymer can be carried out over a wide range of temperature. In general, a suitable reaction temperature is from —100 to +150° C. preferably in the range of from —75 to +75° C. The particular reaction temperature employed is determined by the nature of the polymer being treated and by the active halogen containing compound which is used. The amount of active halogen containing compound which is provided in the reaction system will depend on the type of product desired. If the terminally reactive polymer contains two alkali metal end groups, maximum reaction or coupling of the polymer with the active halogen containing compound is obtained by providing one equivalent of halogen per equivalent of alkali metal in the polymer. An excess of halogen containing compound will give a product with active halogen end groups while the use of less than one equivalent of halogen per equivalent of alkali metal will yield a product with alkali metal end groups. The quantity of active halogen containing compound used is generally in the range of from 0.5:1 to 5:1 equivalents based on the original initiator charge. Usually the polymer product is hydrolyzed or reacted with a material such as an acid, which is capable of replacing alkali metals with hydrogens.

The polymer products of this invention are in some instances self-curing, that is, they can be cured by heating alone without the use of auxiliary curatives. The curing occurs by reaction of reactive groups in the polymers with double bonds in the same or different polymer chains, the degree of curing being determined by the amount of reactive groups in the polymer. For example, cross-linking can occur through activating and functional groups such as carbonyl groups, double bonds, vinyloxy groups, etc. Also, if an excess of the active halogen containing compound is employed or if said compound contains more than two active halogens, cross-linking can take place by reaction of the halogen with double bonds.

The curing reaction is usually carried out by heating the polymer to temperatures in the range of between about 100 and about 500° F. and preferably between about 200 and about 400° F. The time required for curing depends on the temperature, the particular polymer being cured and the degree of curing desired. Usually curing is carried out over a period ranging from as low as 2 minutes to as high as 24 hours or higher. As desired prior to curing polymers can be compounded with suitable reinforcing agents and fillers well known in the industry such as carbon black and mineral fillers.

The following reactions illustrate the curing reaction:

(1)

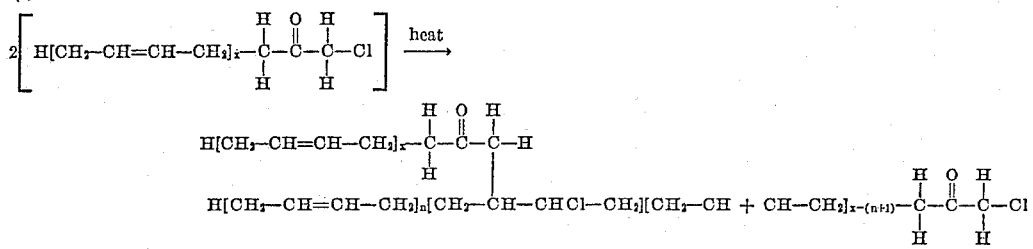

where $n$ can vary from 0 to $x-1$.

The above polymer has been hydrolized to replace the Li atoms at one end of the chain with H. This step is desirable to product the self-curing polymer.

(2)

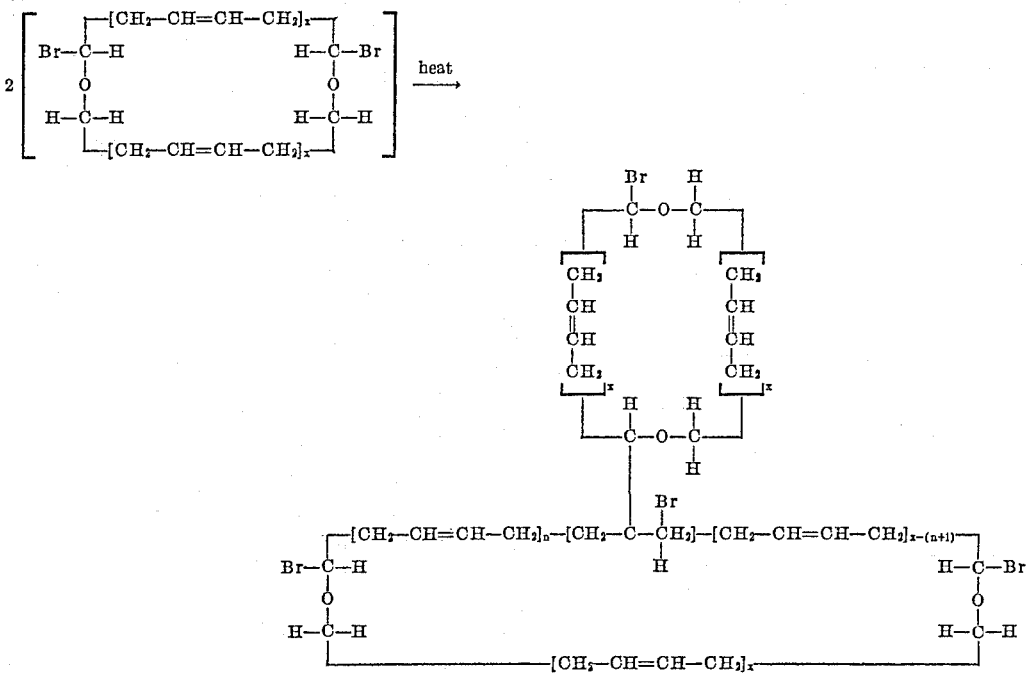

where $n$ can vary from 0 to $x-1$.

In combination with heat curing it is within the scope of the invention to provide conventional auxiliary curing agents such as sulfur, oxygen, organic peroxides and hydroperoxides, bis-azobutyronitrile and diazo thioethers. Materials which are free radical generators are ordinarily regarded as being useful as curatives in the systems. A particularly effective curing agent is dicumyl peroxide. Other materials well known as rubber curing agents include Santocure (N - cyclohexyl - 2 - benzothiazylsulfenamide), Altax (benzothiazyldisulfide), methyl Tuads (tetramethylthiuram disulfide) and N,N - dimethyl - S-tert-butylsulfenyldithiocarbamate. The auxiliary curing agents can be used when a tighter or greater degree of cure is desired than can be obtained by heat alone.

Various types of polymers can be produced by the method of this invention. If the polymer chain has only one carbon-lithium bond and the active halogen containing compound contains two active halogen atoms, the resultant polymer is linear with the molecular weight being approximately double that of the starting material. If the active halogen containing compound has three active halogen atoms, the resultant polymer will have a Y shape with a molecular weight approximately triple that of the starting material. Polymers which contain alkali metal atoms at each end of the polymer chain are converted to high molecular weight linear products by treatment with compounds containing two active halogen atoms, the amount of the treating agent employed controlling the length of the polymer chain.

In the preferred method of this invention liquid and semi-solid polymers are converted to rubbery and plastic products and polymers which are originally rubbery or solid are further cured. When operating in accordance with the invention a wide variety of products can be obtained to give materials which are suitable as adhesives, potting compounds, tread stocks and also for the manufacture of many types of molded objects. Plastic products which have a high impact strength frequently have a low tensile strength, however materials prepared in accordance with the present invention have both high impact and high tensile strength. Another outstanding characteristic of the polymers of this invention is that they are clear and colorless. In addition rubbery polymers of this invention, obtained after treatment of the terminally reactive polymer with the active halogen containing compound, then compounded and cured have lower heat build-up properties than untreated rubbers.

The following examples are presented in illustration of the invention:

Example I

A reactor, fitted with a condenser and stirrer and maintained under a prepurified nitrogen atmosphere, was charged with the following ingredients:

| | |
|---|---|
| Diethyl ether, anhydrous | 1,000 ml. |
| Tetrahydrofuran | 100 ml. |
| Lithium wire, low sodium | 6.9 grams (1.0 gram atom). |
| trans-Stilbene (1,2-diphenylethylene) | 36.0 grams (0.20 mole). |

The mixture was refluxed gently for one hour after which it was siphoned into quart bottles which were then capped and pressured with nitrogen. The concentration of 1,2-dilithio-1,2-diphenylethane was assumed to be equivalent to half the total alkalinity and was determined by titration of two milliliter samples with aqueous 0.0497 N hydrochloric acid using phenolphthalein as the indicator. The concentration of the 1,2-dilithio-1,2-diphenylethane determined by this method was 0.199 molar.

The 1,2-dilithio-1,2-diphenylethane was used as the initiator in a series of polymerizations for the preparation of styrene-butadiene-styrene block copolymers. One run was made which contained no butadiene monomer. Polymerization recipes were as follows:

| | Recipes | | | | |
|---|---|---|---|---|---|
| | 1 | 2 | 3 | 4 | 5 |
| Butadiene, parts by weight | 20 | 15 | 10 | 5 | 0 |
| Styrene, parts by weight | 80 | 85 | 90 | 95 | 100 |
| Cyclohexane, parts by weight | 1,170 | 1,170 | 1,170 | 1,170 | 1,170 |
| 1,2-dilithio-1,2-diphenylethane, mmoles | 0.7 | 0.7 | 0.7 | 0.7 | 0.7 |
| Temperature, °C | 50 | 50 | 50 | 50 | 50 |
| Time, hours | 4 | 4 | 4 | 4 | 2 |

Polymerizations were effected in quart bottles. The cyclohexane employed was process grade. It was dried by first passing it over activated alumina and then by countercurrent scrubbing with prepurified nitrogen. It was charged to the bottle first after which nitrogen was passed through it for 5 minutes at the rate of 3 liters per minute. Butadiene was then charged (first four runs) followed by the 1,2-dilithio-1,2-diphenylethane and temperature of the mixture was held at 50° C. for two hours to allow the butadiene to polymerize. Styrene was added and polymerization was continued for another two hours.

A 20-milliliter sample was withdrawn from each bottle and the polymer was coagulated with isopropanol. Approximately one percent by weight of 4,4'-thio-bis(6-tert-butyl-meta-cresol), based on the butadiene charged, or not less than 0.1 weight percent based on the total polymer, was added to the wet crumb and kneaded in by hand. The samples were vacuum dried. All products were white plastics.

Each of the remaining unquenched polymer solutions was treated with a 0.3 molar solution of bis(chloromethyl) ether in cyclohexane using 0.7 millimole per hundred parts monomers charged. This amount was equivalent to the quantity of 1,2-dilithio-1,2-diphenylethane employed. After a 2-hour reaction period at 50° C., the polymers were coagulated with isopropanol, 4,4'-thio-bis(6-tert-butyl-meta-cresol) was added to the wet crumb in amounts hereinbefore given, and the products were vacuum dried. All were white plastics. The products were tough solids after the bis(chloromethyl) ether treatment but there was no change in appearance. The following table shows inherent viscosity and gel data before and after coupling with bis(chloromethyl) ether:

| Run | Inherent viscosity before coupling [1] | Gel, percent [2] | Conversion, percent | Inherent viscosity after coupling [1] | Gel, percent [2] |
|---|---|---|---|---|---|
| 1 | 2.76 | 0 | 96 | 9.01 | 5 |
| 2 | 2.69 | 0 | Quantitative | 7.70 | 0 |
| 3 | 2.20 | 0 | Quantitative | 7.06 | 0 |
| 4 | 2.17 | 0 | Quantitative | 6.88 | 0 |
| 5 | 1.93 | 0 | 99 | 4.70 | 0 |

[1] One tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration. The cage, after removal from the two-ounce bottle, was placed in an aluminum weighing dish of known weight and the cage and dish were placed in a vacuum drying oven at 70–80° C. for one hour after which they were allowed to cool to room temperature and weighed. Subtracting the sum of the weights of the aluminum dish and the cage from the latter weighing gave the weight of the gel which was finally corrected for solution retention on the cage and for soluble polymer remaining within the gel structure."

The increase in inherent viscosity after treatment with bis(chloromethyl) ether is evidence of the coupling reaction which occurred.

Impact strength, tensile yield, tensile break, and elongation were determined on the five plastic products obtained after coupling with bis(chloromethyl) ether. Similar properties were also determined on four commercial polystyrenes. Results were as follows:

| | Impact [3] ft. lbs./in | Tensile yield, p.s.i. [4] comp. molded | Tensile break, p.s.i. [5] comp. molded | Elongation break, percent [6] comp. molded |
|---|---|---|---|---|
| Product from run— | | | | |
| 1 | 2.02 | 1,880 | 1,827 | 133 |
| 2 | 1.14 | 2,883 | 2,740 | 17 |
| 3 | 0.53 | 3,927 | 3,927 | 8 |
| 4 | 0.41 | 5,750 | 5,750 | 3 |
| 5 | 0.58 | 4,130 | 4,130 | 2 |
| Commercial polystyrene: | | | | |
| Lustrex (A) | 0.56 | 3,063 | 2,853 | 59 |
| Styron (high impact grade) (B) | 0.65 | 2,870 | 2,493 | 15 |
| Styron (extra high impact grade) (B) | 3.98 | 1,527 | 1,580 | 59 |
| Dylene (C) | 0.18 | 3,290 | 3,290 | 17 |

NOTE.—(A) Monsanto; (B) Dow; (C) Koppers.
[3] Impact strength was determined by the Izod impact resistance test, ASTM D256-54T.
[4,5,6] Determined by ASTM D412-51T except for the cross-head speed. Test specimens were died out of a compression molded slab using a type C die for rubber specimens. These specimens measured 4.5" long, 0.250" wide in the flat test section, and 0.06" thick. Stress-strain properties were obtained at 73±2 C. In Example I, the cross-head speed for Run 1 was 0.50" per minute and for Runs 2, 3, 4 and 5 it was 0.05" per minute. Cross-head speed for Lustrex and Dylene was 0.05" per minute and for the two Styron samples it was 0.50" per minute. The cross-head speed for the products in Example II was 0.50" per minute.

Reference to the foregoing data reveals that plastic products which have an impact strength similar to some of the commercial polystyrenes tested having a much higher tensile strength than the commercial products. It is possible, when operating in accordance with the present process, to produce plastic products which have both high impact strength and high tensile strength.

*Example II*

Two polymerization runs were made for the production of 37.5–25–37.5 and 40–20–40 styrene-butadiene-styrene block copolymers using the 1,2-dilithio-1,2-diphenylethane initiator described in Example I. Polymerization recipes were as follows:

|  | Recipes | |
| --- | --- | --- |
|  | 1 | 2 |
| Butadiene, parts by weight | 25 | 20 |
| Styrene, parts by weight | 75 | 80 |
| Cyclohexane, parts by weight | 1,170 | 1,170 |
| 1,2-dilithio-1,2-diphenylethane, millimoles | 0.8 | 0.7 |
| Temperature, °C | 50 | 50 |
| Time, hours | 4 | 4 |

The procedure described in Example I was followed with the butadiene being charged first and allowed to polymerize for two hours prior to addition of the styrene. At the end of the polymerization, a 20-milliliter sample was withdrawn from each bottle, coagulated with isopropanol, 4,4'-trio-bis(6-tert-butyl-meta-cresol) was added, and the products were vacuum dried. They were white plastics.

The remaining unquenched polymer solutions were treated with a 0.3 molar solution of bis(chloromethyl) ether in cyclohexane. Time allowed for the reaction was 24 hours and the temperature was 50° C. White solid products were obtained after coagulation of the polymers with isopropanol and drying them in vacuo. The following table shows quantities of materials charged and inherent viscosity and gel data:

| Run | Recipe | 1,2-dilithio-1,2-diphenylethane, MHM [a] | Bis(chloromethyl) ether, MHM [a] | Conversion, percent | Inherent viscosity[1] | Gel, percent[1] |
| --- | --- | --- | --- | --- | --- | --- |
| 1A | 1 | 0.8 | | 100 | 2.17 | 0 |
| 1B | 1 | 0.8 | 0.8 | 98.0 | 8.72 | 0 |
| 2A | 2 | 0.7 | | 100 | 2.46 | 0 |
| 2B | 2 | 0.7 | 0.7 | 97.5 | 8.12 | 0 |

[a] Millimoles per 100 parts monomers.
[1] Same as in Example I.
[2] Same as in Example I.

The marked increase in inherent viscosity after treatment with bis(chloromethyl) ether is evidence that coupling occurred. The products were gel free and were, therefore, not crosslinked.

The following physical data were obtained on the two plastic products which resulted from coupling with bis(chloromethyl) ether:

| Run | Ft. lbs./in. | Tensile yield, p.s.i. comp. molded [4] | Tensile break, p.s.i. comp. molded [5] | Elongation break, percent comp. molded [6] |
| --- | --- | --- | --- | --- |
| 1B | [a]16.10 | 1,120 | 1,070 | 69 |
| 2B |  | 1,790 | 1,773 | 148 |

[a] Sample was highly flexible and did not break.
[4][5][6] Same as in Example I.

*Example III*

1,2-dilithio-1,2-diphenylethane was prepared in a quart beverage bottle using the following recipe:

trans-Stilbene _____ 14.4 grams (0.08 mole).
Lithium wire, low sodium __ 2.8 grams (0.4 gram atom).
Diethyl ether, anhydrous [1] __ 400 ml.
Tetrahydrofuran, anhydrous [2] _____ 40 ml.

[1] Dried over sodium.
[2] Dried by distillation from lithium aluminum hydride.

The reactants were agitated at 30° C. for three hours. The 1,2-dilithio-1,2-diphenylethane was used as the initiator in a series of polymerizations for the production of styrene-butadiene-styrene (25–50–25 and 15–70–15) and butadiene-styrene-butadiene (25–50–25 and 15–70–15) block copolymers. The procedure employed was similar to that of the preceding examples with the solvent (cyclohexane) being charged first, followed by the initial monomer charge and then the initiator. The table which follows shows when the ingredients were charged and the final recipe in each run. Bis(chloromethyl) ether was used as the coupling agent in each run.

| | Parts by weight | | | Millimoles | | Temp., °C | Time, hours |
| --- | --- | --- | --- | --- | --- | --- | --- |
| | Butadiene | Styrene | Cyclohexane | 1,2-dilithio-1,2-diphenylethane | Bis(chloromethyl) ether | | |
| Run A: | | | | | | | |
| A-1, initial charge [a] | 50 | | 1,170 | 10 | | 50 | 2 |
| Increment No. 1 [a] | | 50 | | | | 50 | 2 |
| A-2, recipe after increment added [a] | 50 | 50 | 1,170 | 10 | | 50 | 4 |
| Increment No. 2 [a] | | | | | 10 | 50 | 16 |
| A-3, final recipe | 50 | 50 | 1,170 | 10 | 10 | 50 | 20 |
| Run B: | | | | | | | |
| B-1, initial charge [a] | | 50 | 1,170 | 10 | | 50 | 2 |
| Increment No. 1 [a] | 50 | | | | | 50 | 2 |
| B-2, recipe after increment added [a] | 50 | 50 | 1,170 | 10 | | 50 | 4 |
| Increment No. 2 [a] | | | | | 10 | 50 | 16 |
| B-3, final recipe | 50 | 50 | 1,170 | 10 | 10 | 50 | 20 |
| Run C: | | | | | | | |
| C-1, initial charge [a] | 70 | | 1,170 | 10 | | 50 | 2 |
| Increment No. 1 [a] | | 30 | | | | 50 | 2 |
| C-2, recipe after increment added [a] | 70 | 30 | 1,170 | 10 | | 50 | 4 |
| Increment No. 2 [a] | | | | | 10 | 50 | 16 |
| C-3, final recipe | 70 | 30 | 1,170 | 10 | 10 | 50 | 20 |
| Run D: | | | | | | | |
| D-1, initial charge [a] | | 30 | 1,170 | 10 | | 50 | 2 |
| Increment No. 1 [a] | 70 | | | | | 50 | 2 |
| D-2, recipe after increment added [a] | 70 | 30 | 1,170 | 10 | | 50 | 4 |
| Increment No. 2 [a] | | | | | 10 | 50 | 16 |
| D-3, final recipe | 70 | 30 | 1,170 | 10 | 10 | 50 | 20 |

[a] Given in terms of amount in final recipe.

Samples from each initial polymerization and also after the monomer increment was added were withdrawn, coagulated with isopropanol, vacuum dried, and conversion and inherent viscosity were determined. Refractive index was determined in some cases. The remaining unquenched polymer solutions were treated with bis(chloromethyl) ether, coagulated with isopropanol, vacuum dried, and conversion, inherent viscosity, refractive index, and Mooney values (ML-4 at 212° F.) were determined. The following table shows these results:

| Recipe | Conversion, percent | Inherent viscosity [1] | ML-4 at 212° F. [7] | Refractive index at 25° C. [8] | Polymer appearance |
|---|---|---|---|---|---|
| Run A: | | | | | |
| A-1 | 100 | 0.42 | | 1.5123 | Liquid. |
| A-2 | 91 | 0.36 | | | Sticky, semi-solid. |
| A-3 | 88.5 | 0.90 | 42 | 1.5515 | Firm, clear solid; rubbery. |
| Run B: | | | | | |
| B-1 | 100 | 0.11 | | | Solid. |
| B-2 | 99.2 | 0.21 | | | Sticky, semi-solid. |
| B-3 | 96.5 | 0.65 | 25 | 1.5531 | Firm, clear solid; rubbery. |
| Run C: | | | | | |
| C-1 | 99.3 | 0.32 | | 1.5123 | Liquid. |
| C-2 | 99.6 | 0.37 | | 1.5353 | Sticky, semi-solid. |
| C-3 | 92.2 | 1.14 | 29 | 1.5358 | Tough, clear solid; rubbery. |
| Run D: | | | | | |
| D-1 | 100 | 0.09 | | | Solid. |
| D-2 | 97.7 | 0.26 | | 1.5364 | Sticky, semi-solid |
| D-3 | 93.5 | 0.84 | 13 | 1.5368 | Tough, clear solid; rubbery. |

[1] Same as in Example I.
[7] Determined by ASTM D927–55T.
[8] The sample was placed on the prism of a Model 808 Spencer Lens Company refractometer. The refractive index was determined at 25° C.

The refractive index values demonstrate that styrene is present in the block polymers. Treatment of the unquenched block polymer with bis(chloromethyl) ether in each case gave a rubbery product whereas without this treatment the products were sticky, semi-solids.

*Example IV*

The reactants and solvents listed below were charged to a one-quart bottle which was then agitated at 30° C. for 2 hours. At the end of this time, the solution was separated from the unreacted lithium wire by pressuring it into a clean bottle. A 2.0 milliliter sample was withdrawn by hypodermic syringe, added to distilled water, and titrated to the phenolphthalein end point. Molarity as 1,2-dilithio-1,2-diphenylethane was calculated on the basis of total alkalinity and found to be 0.19.

| | |
|---|---|
| trans-Stilbene | 14.4 grams (0.08 mole). |
| Lithium wire, low sodium | 2.8 grams (0.4 g. atom). |
| Diethyl ether, anhydrous | 400 ml. |
| Tetrahydrofuran, anhydrous | 40 ml. |
| Time, hours | 2. |
| Temperature, ° C | 30. |

The 1,2-dilithio-1,2-diphenylethane was employed as the initiator for the preparation of a series of butadiene-styrene random copolymers which were high in styrene content. The runs were made using variable initiator levels. The polymerization recipe was as follows:

| | |
|---|---|
| Butadiene, parts | 25 |
| Styrene, parts | 75 |
| Cyclohexane, parts [1] | 1,170 |
| Tetrahydrofuran, parts [2] | 2 |
| 1,2-dilithio-1,2-diphenylethane, millimoles | Variable |

[1] Dried as described in Example I.
[2] Distilled from lithium aluminum hydride.

Polymerization was effected at four initiator levels at a temperature of 50° C. After two hours a 20-milliliter sample was removed from each run in order to have polymer representative of each recipe. Bis(chloromethyl) ether was then added as a 0.30 molar solution in cyclohexane to the remainder of each of the unquenched polymer solutions and the reactions were continued another two hours at the same temperature. The polymers were all coagulated with isopropanol and vacuum dried. The following table shows the initiator level, amount of bis(chloromethyl) ether added, conversion, and results of inherent viscosity and gel determinations:

| Run | 1,2-dilithio-1,2-diphenylethane, mmoles [a] | Bis(chloromethyl) ether, mmoles [a] | Conversion, percent | Inherent viscosity [1] | Gel, percent [2] |
|---|---|---|---|---|---|
| 1A | 1.2 | | 100 | 2.29 | 0 |
| 1B | 1.2 | 1.2 | 77 | 3.49 | 0 |
| 2A | 1.1 | | 100 | 2.04 | 0 |
| 2B | 1.1 | 1.1 | 99.8 | 5.08 | 0 |
| 3A | 1.0 | | 100 | 2.37 | 0 |
| 3B | 1.0 | 1.0 | 99.6 | 5.67 | 0 |
| 4A | 0.9 | | 100 | 3.10 | 0 |
| 4B | 0.9 | 0.9 | 100 | 6.42 | 0 |

[a] Per 100 parts monomers.
[1][2] Same as in Example I.

The products obtained by treatment of the polymers with bis(chloromethyl)ether were tough, gel free, plastics which had a much higher inherent viscosity after treatment with bis(chloromethyl) ether.

*Example V*

The 1,2-dilithio-1,2-diphenylethane described in Example IV was employed as the initiator for the preparation of a series of 10/90 butadiene-styrene random copolymers. Variable initiator levels were used in the runs. The polymerization recipe was as follows:

| | |
|---|---|
| Butadiene, parts | 10 |
| Styrene, parts | 90 |
| Cyclohexane, parts | 1,170 |
| Tetrahydrofuran, parts | 2 |
| 1,2-dilithio-1,2-diphenylethane, mmoles | Variable |

Polymerization was effected at three initiator levels at a temperature of 50° C. After two hours a 0.30 molar solution of bis(chloromethyl) ether in cyclohexane was added and the reactions were allowed to continue at the same temperature for 15 more hours. Parallel runs to which no bis(chloromethyl) ether was added were made for control purposes. The polymerization time for these runs was 2 hours. All polymers were coagulated with isopropanol and vacuum dried after one weight percent of 4,4'-thio-bis(6-tert-butyl-meta-cresol), based on the butadiene charged, was added to the wet crumb. The initiator level, amount of bis(chloromethyl) ether added, conversion, and results of inherent viscosity and gel determinations are shown in the following table:

| Run | 1,2-dilithio-1,2-diphenylethane, mmoles | Bis(chloromethyl) ether, mmoles | Conversion, percent | Inherent viscosity [1] | Gel, percent [2] |
|---|---|---|---|---|---|
| 1A | 1.1 | | 100 | 1.83 | 0 |
| 1B | 1.1 | 1.1 | 100 | 4.33 | 0 |
| 2A | 1.0 | | 90 | 2.57 | 0 |
| 2B | 1.0 | 1.0 | 100 | 4.42 | 0 |
| 3A | 0.9 | | 95 | 3.99 | 0 |
| 3B | 0.9 | 0.9 | 100 | 5.61 | 0 |

[1] Same as in Example I.
[2] Same as in Example I.

All products weer gel free plastics but those which resulted from the bis(chloromethyl) ether treatment had a much higher inherent viscosity than those which were not treated. These results indicate that a coupling reaction occurred.

*Example VI*

A 15–70–15 styrene-butadiene-styrene rubbery block copolymer was prepared using the 1,2-dilithio-1,2-diphenylethane initiator described in Example IV. The polymerization recipe was as follows:

| | |
|---|---|
| Butadiene, parts | 70 |
| Styrene, parts | 30 |
| Cyclohexane, parts [a] | 1170 |
| 1,2-dilithio-1,2-diphenylethane, mmoles | 10 |

[a] Dried as described in Example I.

The butadiene was charged and polymerization was effected at 50° C. for three hours. Styrene was then added and polymerization was continued for two hours at the same temperature. A sample was withdrawn at each stage of the process, designated as A and B, and conversion, inherent viscosity, and gel were determined. Samples for these determinations were obtained by adding a small quantity of isopropanol to the reaction mixtures and then evaporating the solvent at 57° C. for 24 hours in a vacuum oven. Some of the polymer from stage B (block polymer) was subjected to oxidative degradation and the percent polystyrene was obtained as well as the inherent viscosity of the recovered product. A 0.30 molar solution of bis(chloromethyl) ether was added to the remaining unquenched polymer solution and the reaction was allowed to continue for 16 more hours at 50° C. The product was coagulated with isopropanol and vacuum dried. A rubbery polymer was obtained. A portion of the resulting material was subjected to oxidative degradation. The percent polystyrene was determined and also the inherent viscosity of the recovered product. Results are shown in the following table:

| Stage of process | Conversion, percent | ML-4 [7] 212° F. | Inherent viscosity [1] | Gel, percent [2] | Refractive index [8] | Polystyrene by degradative oxidation, percent | Inherent viscosity of recovered product [1] |
|---|---|---|---|---|---|---|---|
| A | 100 | | 0.29 | 0 | 1.5133 | | |
| B | 100 | | 0.27 | 0 | 1.5369 | 14.7 | 0.02 |
| C | 97.5 | 38.5 | 1.10 | 0 | 1.5363 | 22.8 | 0.07 |

[1][2] Same as in Example I.
[7][8] Same as in Example III.

The block polymer, both before and after treatment with bis(chloromethyl) ether, was subjected to a degradative oxidation procedure which destroyed the polymer molecules that contained unsaturation (polybutadiene). This oxidation method is based upon the principle that polymer molecules containing ethylenic bonds, when dissolved in p-dichlorobenzene and toluene, can be broken into fragments by reaction with tert-butyl hydroperoxide catalyzed with osmium tetroxide. Saturated polymer molecules or molecular fragments such as polystyrene or the polystyrene units in block polymers containing no ethylenic bonds remain unattacked. The small fragments (low molecular weight aldehydes) and the low molecular weight polystyrene fragments from the copolymer block are soluble in ethanol whereas the unattacked high molecular weight polystyrene from the styrene homopolymer block is insoluble in ethanol. It is thus possible to effect a separation of the high molecular weight polystyrene which constitutes the homopolymer block of the block polymer.

Approximately 0.5 gram of the polymer to be subjected to the oxidation procedure was cut into small pieces, weighed to within one milligram, and charged to a 125 milliliter flask. Forty to 50 grams of p-dichlorobenzene was then charged to the flask and the contents were heated to 130° C. This temperature was maintained until the polymer was dissolved. The solution was then cooled to 80 to 90° C. after which 8.4 ml. of a 71.3 weight percent aqueous solution of tert-butyl hydroperoxide was added. One milliliter of 0.003 molar osmium tetroxide in toluene was then added to the reaction mixture and the resulting solution was heated to between 110 and 115° C. for 10 minutes. The solution was cooled to between 50 and 60° C., 20 ml. of toluene was added, and the mixture was poured slowly into 250 ml. of ethanol containing a few drops of concentrated sulfuric acid. Polystyrene precipitated and was recovered and dried. The amount recovered in the B and C stages of the process is shown in the preceding table.

The 15–70–15 styrene-butadiene-styrene rubbery block polymer which was coupled with bis(chloromethyl) ether had the following properties:

| | |
|---|---|
| Mooney value (ML-4 at 212° F.) | 39 |
| 300% modulus, p.s.i. | 340 |
| Green tensile, p.s.i. | 500 |
| Elongation, percent | 920 |

The rubbery block polymer (coupled product) was compounded in two gum stock and two tread stock recipes as follows:

| | Recipes | | | |
|---|---|---|---|---|
| | 1 (gum) | 2 | 3 (gum) | 4 |
| Polymer | 100 | 100 | 100 | 100 |
| Carbon black (Philblack 0) [a] | | 50 | | 50 |
| Zinc oxide | 3 | 3 | 3 | 3 |
| Stearic acid | 2 | 2 | 2 | 2 |
| Resin 731 [b] | 3 | 3 | 3 | 3 |
| Flexamine [c] | 1 | 1 | 1 | 1 |
| Sulfur | 1.8 | 1.8 | 2.0 | 2.0 |
| Santocure [d] | 1.2 | 1.2 | | |
| Methyl Tuads [e] | | | 0.9 | 0.9 |
| Captax [f] | | | 0.4 | 0.4 |

[a] High abrasion furnace black.
[b] Disproportionated pale rosin stable to heat and light.
[c] Physical mixture containing 65 percent of a complex diarylamine-ketone reaction product and 35 percent of N,N'-diphenyl-p-phenylenediamine.
[d] N-cyclohexyl-2-benzothiazylsulfenamide.
[e] Tetramethyl thiuram disulfide.
[f] 2-mercaptobenzothiazole.

The stocks were cured 45 minutes at 307° F. and physical properties determined. Recipes 3 and 4 were intended to give tight cures. Results were as follows:

| Sample from recipe | 300% modulus, p.s.i.[9] | Tensile, p.s.i.[9] | Elongation, percent [9] | $V_r$ [10] | Resilience, percent [11] | ΔT, ° F. [12] |
|---|---|---|---|---|---|---|
| 1 | 240 | 900 | 740 | 0.324 | 55.3 | 60.2 |
| 2 | 1,960 | 2,920 | 450 | 0.366 | 44.6 | 79.7 |
| 3 | 470 | 580 | 370 | 0.392 | 58.9 | 31.4 |
| 4 | | 2,810 | 280 | 0.441 | 46.2 | 57.1 |

[9] The 300% modulus, tensile strength and elongation of the rubber samples were determined by a modification of ASTM D412-51T. Test specimens were died out of slabs 20 mils thick using Type D die. These specimens measured 4″ long and 0.125″ wide in the flat test section. Stress-strain properties were obtained at 73±2° C. The cross-head speed in these tests was 20″ per minute.
[10] The $V_r$ determination was made by cutting samples of the cured polymer weighing approximately 1.5 grams from regular tensile slabs, weighing them on an analytical balance, and allowing them to swell in n-heptane for 6 days at 30° C. The swollen specimens were blotted with filter paper and transferred quickly to tared weighing bottles. The volume of imbibed solvent was obtained by dividing the difference between the weight of the swollen sample and the weight of the dry, extracted sample (dried 16 hours at 70° C. in vacuo) by the density of the solvent. Next the dry samples were weighed in methanol and their volume calculated. From this volume was subtracted the volume of fillers (calculated from the recipe and original sample weight) giving the volume of polymer. The latter was used to calculate the volume fraction of polymer in the swollen stock ($V_r$). This method is described in Rubber World, 135, No. 1, 67–73 (1956).
[11] Determined using a Yerzley oscillograph. The method is ASTM D945-55 except for the size of the specimen. It is a right circular cylinder 0.7″ in diameter and 1″ high.
[12] Determined using a Goodrich flexometer. The results are expressed in degrees F. The method is ASTM D623-52T, Method A; 143 p.s.i. load, 0.175-inch stroke, 100° F. oven. ΔT equals rise in temperature above 100° F. oven in 15 minutes.

Two 15–70–15 styrene-butadiene-styrene block polymers having Mooney values of 27 and 56, respectively, which had not been treated with bis(chloromethyl) ether, had the following properties:

| | 1 | 2 |
|---|---|---|
| Mooney value (ML-4 at 212° F.) [7] | 27 | 56 |
| 300% Modulus, p.s.i. [9] | 350 | 430 |
| Tensile, p.s.i. | 600 | 860 |
| Elongation, percent | 615 | 730 |

[7] Same as in Example III.
[9] Same as in Example VI.

These rubbery polymers were compounded in the foregoing tread stock recipes designated as 2 and 4. The stocks were cured 45 minutes at 307° F. and physical properties determined. Results were as follows:

| Polymer | Compounding recipe | 300% modulus, p.s.i.[9] | Tensile, p.s.i. | Elongation, percent | Resilience, percent [11] | ΔT, °F.[12] |
|---|---|---|---|---|---|---|
| 27 ML-4 | 2 | 2,510 | 2,810 | 365 | 46.6 | 197.0 |
| 56 ML-4 | 2 | 2,900 | 2,900 | 310 | 49.0 | 189.6 |
| 27 ML-4 | 4 | -------- | 2,700 | 100 | 52.5 | 85.3 |
| 56 ML-4 | 4 | -------- | 2,710 | 80 | 56.6 | 86.0 |

[9] [11] [12] Same as shown earlier in this example.

These data show that the coupled products had no significant difference in tensile strength from the polymers which had not been treated with bis(chloromethyl) ether but they had much greater elongation and much better heat build-up properties than the untreated rubbers.

*Example VII*

An n-pentane solution of n-butyllithium was prepared by reacting lithium wire and n-butyl chloride in n-pentane. Molarity of the initiator was determined by titration for total alkalinity.

Butadiene was polymerized in the presence of n-butyllithium in accordance with the following recipe:

Butadiene, parts by weight _____ 100
Cyclohexane, parts by weight _____ 390
n-Butyllithium, millimoles _____ Variable
Temperature, °C _____ 50
Time, hours _____ 4

Polymerization was effected in 7-ounce bottles and quantitative conversion was obtained. The butadiene employed was special purity grade which was distilled and the gaseous material was dried by passing it through ethylene glycol before it was condensed. Pure grade cyclohexane was dried over silica and alumina and then bubbled in gallon lots with prepurified nitrogen for 30 minutes at the rate of 3 liters per minute. Samples for polymerization were prepared by charging dry cyclohexane to the bottles first and then passing prepurified nitrogen through the solvent for 5 minutes at the rate of 3 liters per minute. The bottles were capped and butadiene and n-butyllithium were added by means of a hypodermic syringe.

At the end of the polymerization, cyclohexane solutions of bis(chloromethyl) ether, 1,2-bis(bromomethyl)-benzene, and 1,4-bis(chloromethyl)benzene were added to one set of the unterminated polymer solutions by means of hypodermic syringes. The amount of functional group added was either one or two equivalents per lithium atom in the initiator. Runs were also made using 1,5-dichloropentane and 1,5-dibromopentane as additives. The temperature was maintained at 50° C. for one hour after which the polymers were coagulated with isopropanol, dried in a forced-air oven at 125° F., and then in a vacuum oven. One series of runs was made for control purposes. At the end of the polymerization, a toluene solution of phenyl-beta-naphthylamine was added to the controls which were then coagulated by addition of isopropanol. The polymers were dried in a forced air oven at 125° F. and finally in a vacuum oven. Results of inherent viscosity and molecular weight determinations were as follows:

| Treating agent | Equivalents | Initiator level, millimoles | | | | | | | | | |
|---|---|---|---|---|---|---|---|---|---|---|---|
| | | 3 | | 5 | | 10 | | 15 | | 20 | |
| | | I.V.[1] | M.W.[13] | I.V. | M.W. | I.V. | M.W. | I.V. | M.W. | I.V. | M.W. |
| None | -- | 0.83 | 43,800 | 0.57 | 23,900 | 0.37 | 11,900 | 0.27 | 7,200 | 0.22 | 5,100 |
| 1,2-bis (bromomethyl) benzene | 1 | | | | | 0.58 | 24,600 | 0.37 | 11,900 | 0.30 | 8,500 |
|  | 2 | | | | | | | 0.42 | 14,600 | 0.36 | 11,400 |
| 1,4-bis (chloromethyl) benzene | 1 | | | 0.69 | 33,800 | 0.48 | 18,100 | | | | |
|  | 2 | | | 0.71 | 34,100 | 0.42 | 14,600 | | | | |
| Bis (chloromethyl) ether | 1 | 1.27 | 87,100 | 0.82 | 43,000 | 0.59 | 25,200 | 0.42 | 14,600 | | |
| 1,5-dichloropentane | 1 | | | 0.53 | 22,000 | 0.36 | 11,400 | | | | |
| 1,5-dibromopentane | 1 | | | 0.56 | 23,600 | 0.37 | 11,900 | | | | |

[1] Same as in Example I.
[13] The molecular weights were calculated by means of the equation $[\eta]=KM^a$ using the value of K for sodium-polymerized polybutadiene as reported by Scott, Carter, and Magat, J. Am. Chem. Soc. 71, 220 (1949).

Addition of an equivalent of 1,5-dichloro- or 1,5-dibromopentane did not result in coupling, as can be seen from the data. These compounds are outside the scope of active halogen-containing compounds of the invention.

*Example VIII*

1,4-dilithiobutane was prepared in accordance with the following recipe:

Diethyl ether, ml _____ 350
1,4-dichlorobutane, moles _____ 0.10
Lithium metal dispersion, moles _____ 0.50

The diethyl ether was dried over sodium wire and distilled from lithium aluminum hydride. The 1,4-dichlorobutane was purified by washing first with concentrated sulfuric acid and then with water followed by drying over calcium sulfate and distilling.

A one liter Morton flask was provided with a high speed stirrer, a gas inlet, a condenser, and a dropping funnel. The apparatus was first swept with dry, oxygen-free nitrogen for 15 minutes after which 200 milliliters of diethyl ether was introduced. While passage of nitrogen through the flask was continued, the lithium dispersion was added. An ether solution of 1,4-dichlorobutane was introduced slowly while the temperature was maintained between −10 and −30° C. After the addition was completed, the mixture was stirred for two hours and the temperature was allowed to rise slowly to room temperature. The excess lithium metal and lithium salt were separated from the solution by centrifuging. Titration for total alkalinity indicated at 63 percent yield, calculated as dilithiobutane.

1,4-dilithiobutane was used as the initiator for the polymerization of butadiene in accordance with the following recipe:

| | |
|---|---|
| Butadiene, parts | 100 |
| Cyclohexane, parts | 390 |
| 1,4-dilithiobutane, millimoles | Variable |
| Temperature, °C | 50 |
| Time, hours | 1 |

The polymerization procedure was the same as that described in Example VII. Treatment with bis(chloromethyl) ether was also the same as in the preceding example. Results were as follows:

| Run No. | Initiator level | | Bis (chloromethyl) ether milliequivalents | Inherent viscosity [1] |
|---|---|---|---|---|
| | Millimoles | Milliequivalents | | |
| 1 | 3 | 6 | None | 1.91 |
| 2 | 3 | 6 | 3 | 7.27 |
| 3 | 3 | 6 | 6 | 7.25 |
| 4 | 3 | 6 | 12 | 6.67 |
| 5 | 5 | 10 | None | 0.73 |
| 6 | 5 | 10 | 5 | 6.09 |
| 7 | 5 | 10 | 10 | 5.43 |
| 8 | 5 | 10 | 20 | 4.38 |
| 9 | 15 | 30 | None | 0.36 |
| 10 | 15 | 30 | 15 | 0.67 |
| 11 | 15 | 30 | 30 | 1.81 |
| 12 | 15 | 30 | 60 | 1.63 |

[1] Same as in Example I.

All products were gel free. A spectacular increase in inherent viscosity was noted after treatment with bis(chloromethyl) ether. The coupling reaction proceeded at a very rapid rate.

*Example IX*

1,2-dilithio-1,2-diphenylethane was prepared in accordance with the following recipe:

| | |
|---|---|
| Trans-Stilbene, moles | 0.10 |
| Lithium wire, gram atoms | 0.30 |
| Diethyl ether, ml | 600 |
| Temperature | Reflux |
| Time, hours | 3.5 |

A one-liter creased flask provided with a high speed stirrer, gas inlet, and condenser was swept with prepurified nitrogen for 15 minutes. Anhydrous diethyl ether was introduced followed by lithium wire while passage of nitrogen through the flask was continued. Trans-Stilbene was introduced, the stirrer was started, and temperature was regulated at slow refluxing of the ether. After 3.5 hours the reaction mixture was siphoned into 12-ounce bottles, the excess of lithium wire being left in the flask. The yield, based on alkalinity, was 44 percent. It was determined by hydrolyzing 2 ml. of the solution and titrating it with 0.1 N HCl using phenolphthalein as the indicator.

The 1,2-dilithio-1,2-diphenylethane was employed as the initiator for the polymerization of butadiene in accordance with the following recipe:

| | |
|---|---|
| Butadiene, parts | 100 |
| Cyclohexane, parts | 780 |
| 1,2-dilithio-1,2-diphenylethane, millimoles | Variable |
| Temperature, °C | 50 |
| Time, hours | 1 |
| Conversion, percent | Quantitative |

Cyclohexane was charged first, followed by butadiene and then the initiator. The procedure was the same as that described in Example VII, including treatment of the unquenched polymer solution with a cyclohexane solution of bis(chloromethyl) ether. Results were as follows:

| Run No. | Initiator level, mmoles | Bis(chloromethyl) ether, mmoles | Inherent viscosity [1] | Approximate molecular weight [13] |
|---|---|---|---|---|
| 1A | 5 | None | 0.68 | 33,000 |
| 1B | 5 | 5 | 3.34 | 440,000 |
| 2A | 10 | None | 0.28 | 7,600 |
| 2B | 10 | 10 | 1.95 | 180,000 |

[1] Same as in Example I.
[13] Same as in Example VII.

All products were gel free. The marked increase in molecular weight upon treatment with bis(chloromethyl) ether indicated coupling.

*Example X*

A lithium-naphthalene adduct was prepared as follows:

| | |
|---|---|
| Naphthalene, moles | 0.05 |
| Lithium wire, low sodium, moles | 0.20 |
| Tetrahydrofuran, ml | 170 |
| Temperature, °C | 25 |
| Time, hours | 0.75 |
| Yield, percent (as dilithio adduct) | 100 |

The naphthalene was recrystallized from alcohol. The tetrahydrofuran was refluxed and distilled from lithium aluminum hydride.

A 500-ml. Morton flask provided with a high speed stirrer, gas inlet, and condenser was used for the reaction. The apparatus was first swept with prepurified nitrogen for 15 minutes after which the tetrahydrofuran was introduced. Naphthalene and lithium wire were introduced while passage of nitrogen through the flask was continued. The stirrer was started. The reaction was very rapid and exothermic, and after 45 minutes the mixture was siphoned into a 7-ounce bottle, the excess lithium wire being left in the flask.

The lithium-naphthalene adduct was used as the initiator for the polymerization of butadiene. The resulting unquenched polymer solution was treated with bis(chloromethyl) ether. The procedures for both polymerization and coupling reactions were as described in Example VII. The polymerization recipe was as follows:

| | |
|---|---|
| Butadiene, parts | 100 |
| Cyclohexane, parts | 780 |
| Lithium-naphthalene adduct, millimoles | Variable |
| Temperature, °C | 50 |
| Time, hours | 1 |
| Conversion, percent | 100 |

Results of treatment with bis(chloromethyl) ether were as follows:

| Run No. | Initiator level, mmoles | Bis(chloromethyl) ether, mmoles | Inherent viscosity [1] | Approximate molecular weight [13] |
|---|---|---|---|---|
| 1A | 3 | None | 1.11 | 69,000 |
| 1B | 3 | 3 | 2.46 | 250,000 |
| 2A | 5 | None | 0.79 | 41,000 |
| 2B | 5 | 5 | 1.49 | 110,000 |
| 3A | 10 | None | 0.50 | 19,000 |
| 3B | 10 | 10 | 0.83 | 44,000 |

[1] Same as in Example I.
[13] Same as in Example VII.

Having thus described the invention by providing specific examples thereof it is to be understood that no undue limitations or restrictions are to be drawn by reason thereof and that many variations and modifications are within the scope of the invention.

We claim:

1. A process for the preparation of polymer of increased molecular weight which comprises reacting at a temperature in the range of −100 to +150° C. a terminally reactive polymer having the formula $PY_n$ wherein P comprises a polymer of polymerizable vinylidene compounds, Y is a terminally positioned alkali metal and $n$ is an integer of 1 to 4, with an organic reactant material having up to 20 carbon atoms and containing at least two active halogen atoms and being otherwise inert to said alkali metal, each halogen atom being attached to a carbon atom which is alpha to an activating group selected from the group consisting of ether linkage, carbonyl, and

2. A process for the preparation of polymer of increased molecular weight which comprises reacting at a temperature in the range of $-100$ to $+150°$ C. a terminally reactive polymer having the formula $PY_n$ wherein P comprises a polymer of polymerizable vinylidene compounds, Y is a terminally positioned alkali metal and $n$ is an integer of 1 to 4, with from 0.5 to 5 equivalents per equivalent of alkali metal in the polymer of an organic reactant material having up to 20 carbon atoms and containing at least two active halogen atoms and being otherwise inert to said alkali metal, each halogen atom being attached to a carbon atom which is alpha to an activating group selected from a group consisting of ether linkage, carbonyl, and

3. The process of claim 2 in which the polymer is a homopolymer of butadiene and the organic reactant is bis(chloromethyl) ether.

4. The process of claim 2 in which the polymer is a homopolymer of styrene and the organic reactant is bis(chloromethyl) ether.

5. The process of claim 2 in which the polymer is a copolymer of butadiene and styrene and the organic reactant is bis(chloromethyl) ether.

6. The process of claim 2 in which the polymer is a block copolymer of butadiene and styrene and the organic reactant is bis(chloromethyl) ether.

7. The process of claim 2 in which the polymer is a homopolymer of butadiene and the organic reactant is 1,2-bis(bromomethyl)benzene.

8. The process of claim 2 in which the polymer is a homopolymer of butadiene and the organic reactant is 1,4-bis(chloromethyl)benzene.

9. A process for the preparation of polymer of increased molecular weight which comprises reacting at a temperature in the range of $-100$ to $+150°$ C. a terminally reactive polymer having the formula $PY_n$ wherein P comprises a polymer of polymerizable vinylidene compounds, Y is a terminally positioned alkali metal and $n$ is an integer of 1 to 4, with from 0.5 to 5 equivalents per equivalent of alkali metal in the polymer of an organic reactant material having up to 20 carbon atoms and containing at least two active halogen atoms and being otherwise inert to said alkali metal, each halogen atom being attached to a carbon atom which is alpha to an activating group selected from a group consisting of ether linkage, carbonyl, and

and thereafter reacting molecules of the polymer product by heating at a temperature in the range of 100 to 500° F.

10. The process of claim 9 in which heating of the molecules of polymer product is carried out in the presence of a conventional curing system.

11. The process of claim 9 in which the polymer is a homopolymer of butadiene and the organic reactant is bis(chloromethyl) ether.

12. The process of claim 9 in which the polymer is a homopolymer of styrene and the organic reactant is bis(chloromethyl) ether.

13. The process of claim 9 in which the polymer is a block copolymer of butadiene and styrene and the organic reactant is bis(chloromethyl) ether.

14. The process of claim 9 in which the polymer is a homopolymer of butadiene and the organic reactant is 1,2-bis(bromomethyl)benzene.

15. The process of claim 9 in which the polymer is a homopolymer of butadiene and the organic reactant is 1,4-bis(chloromethyl)benzene.

16. The composition prepared in accordance with the process of claim 1.

17. The composition prepared in accordance with the process of claim 3.

18. The composition prepared in accordance with the process of claim 4.

19. The composition prepared in accordance with the process of claim 5.

20. The composition prepared in accordance with the process of claim 9.

References Cited in the file of this patent

UNITED STATES PATENTS

| | | |
|---|---|---|
| 2,666,042 | Nozaki | Jan. 12, 1954 |
| 2,913,444 | Diem et al. | Nov. 17, 1959 |

FOREIGN PATENTS

| | | |
|---|---|---|
| 339,243 | Great Britain | Dec. 1, 1930 |

OTHER REFERENCES

Heany et al.: "J. Chemical Society," 1956, volume 1, page 4692.

Whitby: "Synthetic Rubber," John Wiley and Sons, New York, 1954, page 396.